United States Patent [19]

Takago et al.

[11] Patent Number: 5,358,996
[45] Date of Patent: Oct. 25, 1994

[54] ROOM TEMPERATURE CURABLE POLYETHER COMPOSITION

[75] Inventors: Toshio Takago, Annaka; Kouichi Yamaguchi, Takasaki; Shinichi Sato; Takashi Matsuda, both of Annaka, all of Japan

[73] Assignee: Shin-Etsu Chemical Co., Ltd., Tokyo, Japan

[21] Appl. No.: 101,709

[22] Filed: Aug. 4, 1993

[30] Foreign Application Priority Data

Aug. 4, 1992 [JP] Japan .................. 4-227983

[51] Int. Cl.$^5$ ............... C08L 83/00; C08G 77/06; C09K 3/00
[52] U.S. Cl. .................. 524/588; 528/17; 528/21; 528/25; 528/26; 528/31; 252/182.15
[58] Field of Search .............. 524/588; 528/17, 21, 528/25, 26, 31; 252/182.15

[56] References Cited

U.S. PATENT DOCUMENTS

| | | | |
|---|---|---|---|
| 4,618,646 | 10/1986 | Takago et al. | 528/25 |
| 4,758,646 | 7/1988 | Raleigh et al. | 528/25 |
| 4,877,859 | 10/1989 | Hattori et al. | 528/25 |
| 4,895,917 | 1/1990 | Gruning | 528/25 |
| 5,227,410 | 7/1993 | Eckberg et al. | 528/31 |

*Primary Examiner*—Kriellion S. Morgan
*Attorney, Agent, or Firm*—Oblon, Spivak, McClelland, Maier & Neustadt

[57] ABSTRACT

A room temperature curable polyether composition, comprising a polyether compound of which at least one terminal has a group, represented by the general formula (1):

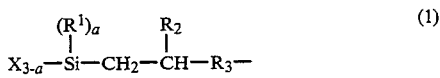

wherein $R^1$ is an alkyl group or an aryl group, $R^2$ is a hydrogen atom or a monovalent organic group, $R^3$ is a divalent organic group, X is a hydrogen atom, a halogen atom, a hydroxyl group, an alkoxyl group, an alkenyloxy group, an acyloxy group, a ketoximate group, an amido group, an aminoxy group or a mercapto group and a is an integer of 0 to 2, and of which main chain comprises a fluorine-containing polyether chain, represented by the general formula (2):

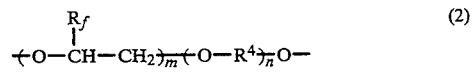

wherein $R_f$ is a perfluoro group, $R^4$ is a divalent organic group, m is an integer of 4 or more and n is an integer of 0 or more. The cured product thereof is excellent in rubber properties and is useful as one-part or two-part type elastic sealant. Furthermore it provides an elastic sealant excellent in solvent-resistance, chemical resistance, water repellency, oil repellency, etc.

9 Claims, No Drawings

ROOM TEMPERATURE CURABLE POLYETHER COMPOSITION

BACKGROUND OF THE INVENTION

1. Field of the Invention

The present invention relates to a room temperature curable polyether composition that can be cured readily with the atmospheric water vapor.

2. Description of the Prior Art

As a room temperature curable polyether composition, a composition comprising a silyl group-terminated polyether which can be cured to form a rubber at room temperatures is proposed in Japanese Pre-examination Patent Publication (KOKAI) No. 54-6097 (1979). However, conventional room temperature curable polyethers are poor in solvent-resistance, chemical resistance, water repellency, oil repellency and heat-resistance.

SUMMARY OF THE INVENTION

An objective of the present invention is to provide a room temperature curable polyether composition that is excellent in solvent-resistance, chemical resistance, water repellency, oil repellency and heat-resistance.

The present invention provides a room temperature curable composition, comprising a polyether compound of which at least one terminal has a silicon-containing organic group represented by the general formula (1):

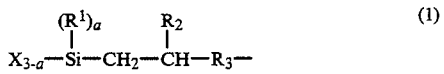

wherein $R^1$ is an alkyl group having 1 to 12 carbon atoms or an aryl group having 6 to 12 carbon atoms, $R^2$ is a hydrogen atom or a monovalent organic group having 1 to 20 carbon atoms, $R^3$ is a divalent organic group having 1 to 20 carbon atoms, X is a hydrogen atom, a halogen atom, a hydroxyl group, an alkoxyl group, an alkenyloxy group, an acyloxy group, a ketoximate group, an amide group, an aminoxy group or a mercapto group, and a is an integer of 0 to 2, and of which backbone chain comprises a fluorine-containing polyether chain with a molecular weight of 500 to 50,000 represented by the general formula (2):

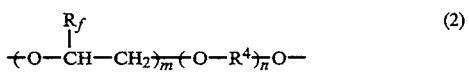

wherein $R_f$ is a perfluoroalkyl group having 1 to 12 carbon atoms, $R^4$ is a divalent organic group having 1 to 20 carbon atoms, m is an integer of 4 or more and n is an integer of 0 or more.

The room temperature curable polyether composition of the present invention is excellent in physical properties after curing and is useful to form a one-part or two-part elastic sealant. Furthermore, it has an advantage to provide an elastic sealant excellent in solvent-resistance, chemical resistance, water repellency, oil repellency, etc., because the polyether backbone chain has a perfluoroalkyl group in its side chains.

DETAILED DESCRIPTION OF PREFERRED EMBODIMENTS

Terminal Group

In the polyether compound as the main component of the composition of the present invention, a silicon-containing organic group, which is linked to at least one terminal of the fluorine-containing polyether backbone chain, is represented by the general formula (1):

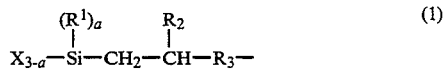

wherein $R^1$ is an alkyl group having 1 to 12 carbon atoms, such as methyl, ethyl or butyl, or an aryl group having 6 to 12 carbon atoms, such as phenyl, tolyl, xylyl or naphtyl, preferably a methyl group, $R^2$ is a hydrogen atom or a monovalent organic group such as a methyl group, $R^3$ is a divalent organic group such as —$CH_2$— or —$CH_2CH_2$—, X is a hydrogen atom, a halogen atom, a hydroxyl group, an alkoxyl group such as a methoxyl group, an ethoxyl group, a propoxyl group, a butoxyl group or methoxyethoxyl group, an alkenyloxy group such as a propenyloxy group or a isobutyloxy group, an acyloxy group such as an acetoxy group, a propionoxy group or a butyroxy group, a ketoximate group such as a methyl ethylketoximate group, an amido group, and aminoxy group or a mercapto group, preferably an alkoxyl group, an alkenyloxy group, an acyloxy group or a ketoximate group and a is an integer of 0 to 2.

Backbone Chain

A fluorine-containing polyether chain as a backbone chain is represented by the general formula (2):

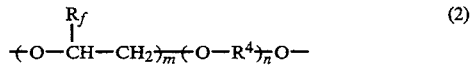

wherein $R_f$ is a perfluoroalkyl group having 1 to 12 carbon atoms, preferably 1 to 8 carbon atoms and includes, for example,

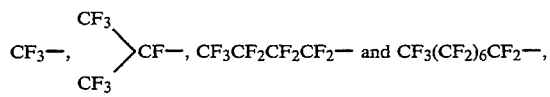

$R^4$ is a divalent organic group having 1 to 20 carbon atoms such as

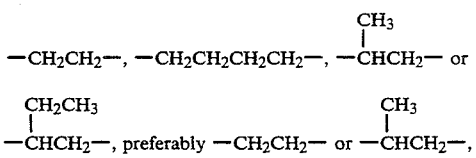

m is an integer of 4 or more and n is an integer of 0 or more. And the molecular weight thereof ranges from 500 to 50,000, preferably 1,000 to 20,000. When the molecular weight is less than 500, the physical properties after curing are considerably lowered. When its molecular weight is over 50,000, it is very inconvenient in handling due to its high viscosity.

The polyether compound has a silicon-containing organic group at least at one terminal of the fluorine-containing polyether chain represented by the general formula (2) and especially it is desirable to have the silicon-containing organic groups in an amount of 70 to 100% on average based on the total terminals.

The type of linkage between a silicon-containing organic group represented by the general formula (1), and a fluorine-containing polyether chain represented by the general formula (2), is not especially limited and the following linkages are listed up, for example; a single bond directly [Note: In this case, an ether bond —O— is formed, owing to an oxygen atom existing at the terminal of the general formula (2). Hereinbelow, linkages including the terminal oxygen atom of the general formula (2) are indicated in Note in the same manner.], a carbonyl bond —CO— [Note: An ester bond —CO—O— is formed.], an —O—CO— bond [Note: A carbonate bond —O—CO—O— is formed.] and an amide bond —NH—CO— [Note: A urethane bond —NH—CO—O— is formed.].

Preparation of Polyether Compound

The polyether compound used in the present invention is prepared, for example, as described below.

Into at least one terminal of a fluorine-containing polyetherglycol represented by the general formula (3):

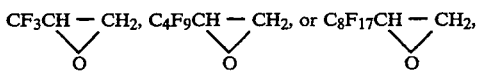

(3)

wherein $R_f$, $R^4$, m and n are as defined above, is introduced an unsaturated group represented by the general formula (4):

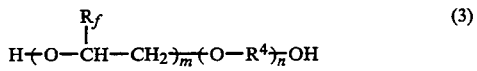

(4)

wherein $R^2$ and $R^3$ are defined as above.

The fluorine-containing polyether, used in the present invention, is obtained, for example, as a polymer of fluorine-containing alkylene oxide, such as

or as a copolymer of such a fluorine-containing alkylene oxide with an alkylene oxide, such as ethylene oxide or propylene oxide. Said polymer or copolymer can be prepared in cation polymerization or anion polymerization, as generally known. Among them, it is preferable to use a fluorine-containing alkylene oxide polymer, prepared from trifluoropropene oxide and propylene oxide as main raw materials.

In order to introduce an unsaturated group having the general formula (4) to a terminal of said fluorine-containing polyether glycol, specifically, the following methods can be used, for example:

(A) At least one hydroxyl terminal group of the glycol having the general formula (3) is converted to an alkaline metal alcoholate by reacting it with an alkaline metal compound, such as alkaline metal hydroxide (e.g. sodium hydroxide) or alkaline metal hydride (e.g. sodium hydride). The obtained alcoholate is then reacted with an unsaturated halide, having the general formula (5):

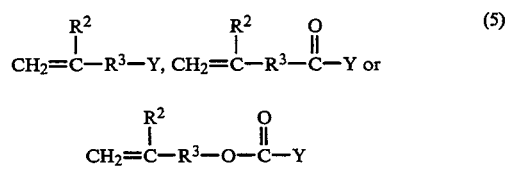

(5)

wherein $R^2$ and $R^3$ are defined as above, and Y is a chlorine atom, a bromium atom or an iodine atom. Thus, an unsaturated group, represented by the general formula (4), is introduced by forming a single bond, a carbonyl bond or —O—CO— bond [Note: an ether bond, an ester bond or a carbonate bond, respectively is formed] as a linkage group.

(B) At least one hydroxyl terminal group of a glycol having the general formula (3) is reacted with an unsaturated isocyanate compound, represented by the following formula:

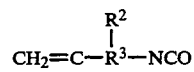

wherein $R^2$ and $R^3$ are defined as above. Thus, an amido bond [Note: a urethane bond is formed] is formed as a linkage group to introduce an unsaturated group, represented by the general formula (4), to a terminal of said glycol.

(C) At least one hydroxyl terminal group of the glycol having the general formula (3) is reacted with an unsaturated acid halide, ester or carboxylic acid represented by the general formula (6):

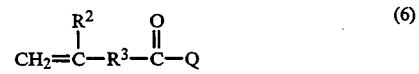

(6)

wherein $R^2$ and $R^3$ are as defined above and Q stands for a halogen atom, such as chlorine, bromine or iodine, an alkoxyl group or a hydroxyl group. Thus, a carbonyl bond [Note: an ester linkage] is formed as a linkage group to give a polyether compound of which fluorine-containing polyether chain having the general formula (2) is linked to an unsaturated group having the general formula (4).

Thus obtained fluorine-containing polyether, to the terminal of which an unsaturated group has been introduced, is then made to react in the presence of a platinum catalyst with a silane compound represented by the general formula (7):

(7)

wherein $R^1$, X and a are as defined above, so that said silane compound is added to the unsaturated terminal group of the fluorine-containing polyether to obtain the desired polyether compound.

Examples of the silane compound, represented by the general formula (7), include halo silanes such as trichloro silane and methyldichlorosilane, alkoxysilanes such as trimethoxysilane, triethoxysilane and methyldimethoxysilane, acyloxysilanes such as methyldiacetoxysilane and phenyldiacetoxysilane, and ketoximesilanes such as bis(dimethylketoxime)methylsilane and bis(cyclohexylketoxime)methylsilane. Among these, alkoxysilanes are especially preferable.

Other Components

The composition of the present invention comprises the said polyether compound as an essential component. By exposing it to the atmosphere, its crosslinking reaction proceeds by absorbing moisture in the atmosphere to give a cured rubber-like elastomer.

Other various components can be optionally added to this composition. For example, the addition of a known curing catalyst can promote the above-mentioned crosslinking or curing reaction. Examples of the said catalysts include amine compounds, quaternary ammonium compounds, organometal compounds, titanium chelate compounds, guanidyl group-containing compounds, etc., and there is no particular limitation about the amount of their addition. Normally, they may be added in an amount of less than about 10 parts per 100 parts of said polyether compound.

Furthermore, for the purpose of adjusting properties of the objective rubber-like elastomer, the following inorganic fillers can be optionally added: known powder fillers, such as fumed silica, precipitated silica, titanium dioxide, aluminum oxide, quartz powder, talc and bentonite, asbestos and glass fiber. The amount of inorganic fillers is preferably 1–500 parts, more preferably 10–300 parts, per 100 parts of said polyether compound. Fibrous fillers like organic fibers may be added. Oil-resistance improvers such as potassium methacrylate, colorants, heat-resistance improvers such as red oxide and cerium oxide, cold-resistance improvers, thixotropy improvers such as polyether dehydrating agents, and adhesive improvers such as γ-aminopropyltriethoxysilane may be optionally added. Desired amounts of these additives may be added as required.

Uses

The composition of the present invention is useful as one-part or two-part type elastic sealants and also as sealants, coating agents and adhesives in the fields of building construction industry, machine industry and electrical industry. Because the polyether compound, the main component of said composition, has a fluorine-containing polyether in the backbone chain, the composition is excellent in solvent-resistance, chemical resistance, surface characteristics such as water repellency, oil repellency and release property. Hence, it is useful as materials for casting rubber and pattern-taking, paints and release agents as well. Especially, it is excellent as non-staining sealants.

EXAMPLES

Examples of the present invention will now be described below, in which "part(s)" means "part(s) by weight."

PREPARATION EXAMPLE 1

Into a 1 liter 4-necked flask equipped with a stirrer, 200 g of a polytrifluoropropyleneglycol having an average molecular weight of 15,000 were charged, and then it was added with 400 g of m-xylene hexafluoride and 4.1 g of triethylamine. While the inside temperature of the flask was kept at 20°–30° C., 4.7 g of an unsaturated group-containing carboxylic acid chloride, expressed by $CH_2=CHCH_2CH_2COCl$, were added dropwise under agitation. After completion of the addition, agitation was continued at 25° C. for 10 hours. After the completion of reaction, the hydrochlorate of triethylamine was removed by washing with water. After dehydration and then removal of volatiles under a reduced pressure, a fluorine-containing polyether having an unsaturated terminal group was obtained.

A 500 ml 4-necked flask equipped with a stirrer was charged with 100 g of the fluorine-containing polyether having an unsaturated terminal group. It was then added with 200 g of m-xylene hexachloride and 0.01 g of an isopropyl alcohol solution containing 1% chloroplatinic acid and heated to 80° C. And then, 2.1 g of methyldimethoxysilane were added dropwise in the flask. After the completion of the addition, agitation was continued at 80° C. for 8 hours. After the completion of the reaction and removal of volatiles under a reduced pressure, a fluorine-containing polyether compound having a silicon-containing terminal group was obtained, which had the $(CH_3O)_2Si(CH_3)(CH_2)_4$ CO-terminal group to in an amount of 91% based on the total terminal groups.

EXAMPLE 1

12 parts of a fumed silica with a specific surface of 150 $m^2/g$, of which surface had been treated with hexamethyldisilazane, and 1.5 parts of titanium dioxide were mixed with 100 parts of the fluorine-containing polyether compound having silicon-containing terminal groups, obtained in Preparation Example 1. After milling the mixture with a 3-roll mill, 0.1 part of dibutyltindioctate was degassed and mixed with them in a state free from water to obtain a room temperature curable polyether composition. The composition was formed to a sheet 2 mm thick. Being kept in the atmosphere of 20° C. and 55% R.H. for 7 days, the sheet was cured to be a rubber-like elastomer. The resulting sheet was measured for hardness, tensile strength and elongation, according to JIS C 2123. The results are given below.

| | |
|---|---|
| Hardness (JIS A*): | 29 |
| Tensile strength ($kgf/cm^2$): | 23 |
| Elongation (%): | 380 |

*Hardness measurement was carried out on a Type A spring hardness tester according to JIS K 6301

PREPARATION EXAMPLE 2

A one liter 4-necked flask equipped with a stirrer was charged with 200 g of polynonafluorohexene glycol having an average molecular weight of 8,000, and was added with 400 g of m-xylene hexafluoride, 8.7 g of 30%-NaOH aq. solution and 1.7 g of tetrabutylammonium hydrogensulfate. While the inside temperature of the flask was kept at 50° C., 7.9 g of allyl bromide ($CH_2=CHCH_2Br$) were added dropwise under agitation. After the completion of the addition, agitation was continued at 50° C. for 8 hours. After the completion of the reaction, the resulting product was washed with water and dehydrated and then volatiles were removed under a reduced pressure to obtain a fluorine-containing polyether having an unsaturated terminal group.

A 500 ml 4-necked flask equipped with a stirrer was charged with the obtained fluorine-containing polyether having an unsaturated terminal group. It was then added with 200 g of m-xylenehexachloride and 0.02 g of an isopropyl alcohol solution containing 1% chloroplatinic acid, and was heated to 80° C. Then, 6.0 g of trimethoxysilane were added dropwise. After the completion of the addition, agitation was continued at 80° C.

for 8 hours. After the completion of the reaction and removal of volatiles under a reduced pressure, the fluorine-containing polyether compound having a silicon-containing terminal group was obtained, which had the $(CH_3O)_3Si(CH_2)_3$-terminal group in an amount of 93% based on the total terminal groups.

EXAMPLE 2

A rubber-like elastomer was obtained in the same manner as in Example 1 except for using 100 parts of the fluorine-containing polyether compound having a silicon-containing terminal group obtained in Preparation Example 2. The obtained rubber-like elastomer was measured for hardness, tensile strength and elongation in the same manner as in Example 1. The results are given below.

| | |
|---|---|
| Hardness (JIS A): | 21 |
| Tensile strength (kgf/cm$^2$): | 19 |
| Elongation (%): | 410 |

Tests

The rubber-like elastomers obtained in Examples 1 and 2 were tested for solvent resistance, chemical resistance and water and oil repellencies. For comparison, a cured product of the composition described in Example 1 of Japanese Pre-examination Patent Publication (KOKAI) No. 54-6097 (1979) was also tested as a control.

Solvent Resistance:

A specimen was dipped in a solvent shown in Table 1 at 25° C. for 48 hours. Thereafter, volume swell (%) was measured. The results are given in Table 1.

TABLE 1

| | (Volume swell, %) | | |
|---|---|---|---|
| | Example 1 | Example 2 | Control |
| Toluene | 22 | 10 | 83 |
| Acetone | 75 | 35 | 156 |
| Methyl acetate | 54 | 30 | 122 |
| Isopropanol | 30 | 15 | 46 |
| Methanol | 5 | 4 | 15 |

Chemical Resistance:

A specimen was dipped in a solution shown in Table 2 at 25° C. for 45 hours. Thereafter volume change (%) was measured. The results are given in Table 2.

TABLE 2

| | (Volume change, %) | | |
|---|---|---|---|
| | Example 1 | Example 2 | Control |
| 10% NaOH aq. solution | 1 | 0 | 18 |
| 10% HCl aq. solution | 0 | 0 | 2 |
| 10% HNO$_3$ aq. solution | 0 | 0 | 8 |
| 10% H$_2$SO$_4$ aq. solution | 1 | 0 | 5 |

Water Repellency and Oil Repellency:

Contact angle formed between a specimen and a droplet of a pure water or a lubricating oil placed on the specimen was measured. The results are given in Table 3.

TABLE 3

| | (Contact angle, degree) | | |
|---|---|---|---|
| | Example 1 | Example 2 | Control |
| Pure water | 86 | 110 | 0 |
| Lubricating oil | 56 | 62 | 36 |

What is claimed is:

1. A room temperature curable polyether composition, comprising a polyether compound of which at least one terminal has a silicon-containing organic group, represented by the general formula (1):

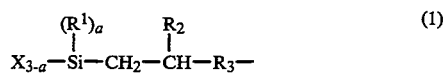

wherein $R^1$ is an alkyl group having 1 to 12 carbon atoms or an aryl group having 6 to 12 carbon atoms, $R^2$ is a hydrogen atom or a monovalent organic group having 1 to 20 carbon atoms, $R^3$ is a divalent organic group having 1 to 20 carbon atoms, X is a hydrogen atom, a halogen atom, a hydroxyl group, an alkoxyl group, an alkenyloxy group, an acyloxy group, a ketoximate group, an amide group, an aminoxy group or a mercapto group and a is an integer of 0 to 2, and of which backbone chain comprises a fluorine-containing polyether chain with a molecular weight of 500 to 50,000, represented by the general formula (2):

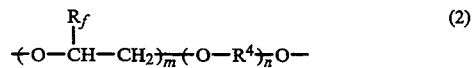

wherein $R_f$ is a perfluoroalkyl group having 1 to 12 carbon atoms, $R^4$ is divalent organic group having 1 to 20 carbon atoms, m is an integer of 4 or more and n is an integer of 0 of more; and a curing catalyst.

2. The composition of claim 1, wherein at least one terminal of the polyether compound is represented by the general formula (1) wherein $R^1$ is a methyl group, $R^2$ is a hydrogen atom or a methyl group, $R^3$ is a methylene group or a dimethylene group, X is an alkoxyl group, an alkenyloxy group, an acyloxy group or a ketoximate group and a is an integer of 0 to 2.

3. The composition of claim 1, wherein the backbone chain of the polyether compound is represented by the general formula (2) wherein $R_f$ is a perfluoroalkyl group having 1 to 8 carbon atoms.

4. The composition of claim 3, wherein $R_f$ in the general formula (2) is expressed by:

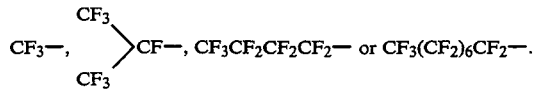

5. The composition of claim 1, wherein $R^4$ in the general formula (2) is expressed by:

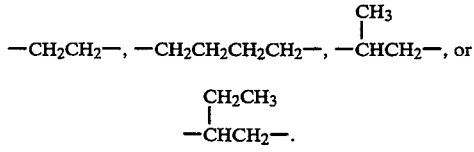

6. The composition of claim 1, wherein in the polyether compound the silicon-containing organic group, represented by the general formula (1), and the backbone chain, represented by the general formula (2), is linked by a carbonyl bond, —O—CO— bond or an amide bond.

7. The composition of claim 1, wherein the said curing catalyst is an amine compound, a quarternary ammonium compound, and an organometal compound, a titanium chelate compound or a guanidyl group-containing compound.

8. The composition of claim 1, which further comprises an inorganic filler.

9. The cured product, obtained by curing the composition as claimed in claim 1.

* * * * *